(12) United States Patent
Veidenbaum et al.

(10) Patent No.: US 7,380,105 B2
(45) Date of Patent: May 27, 2008

(54) PREDICTION BASED INSTRUCTION STEERING TO WIDE OR NARROW INTEGER CLUSTER AND NARROW ADDRESS GENERATION

(75) Inventors: Alexander V. Veidenbaum, Irvine, CA (US); Adrian Cristal Kestelman, Barcelona (ES); Mateo Valero Cortes, Barcelona (ES); Ruben Gonzalez Garcia, Barcelona (ES)

(73) Assignee: The Regents of the University of California, Oakland, CA (US)

( * ) Notice: Subject to any disclaimer, the term of this patent is extended or adjusted under 35 U.S.C. 154(b) by 12 days.

(21) Appl. No.: 11/424,829

(22) Filed: Jun. 16, 2006

(65) Prior Publication Data

US 2007/0294507 A1    Dec. 20, 2007

(51) Int. Cl.
    *G06F 9/30* (2006.01)
(52) U.S. Cl. .................. 712/214; 711/220; 712/200
(58) Field of Classification Search ................ None
    See application file for complete search history.

(56) References Cited

U.S. PATENT DOCUMENTS 5,805,486 A * 9/1998 Sharangpani ............. 708/524

| | | | |
|---|---|---|---|
| 6,260,133 B1 * | 7/2001 | Teruyama | 712/209 |
| 7,171,609 B2 * | 1/2007 | Wilson et al. | 714/795 |
| 2004/0181652 A1 * | 9/2004 | Ahmed et al. | 712/215 |

OTHER PUBLICATIONS

R. González et al., "A Content Aware Integer Register File Organization," 31st ISCA, Jun. 2004.
R. González et al., "An Asymmetric Clustered Processor based on Value Content," 2005 Intl. Conference on Supercomputing.

* cited by examiner

*Primary Examiner*—Kenneth S. Kim
(74) *Attorney, Agent, or Firm*—Shimokaji & Associates, P.C.

(57) ABSTRACT

A method and apparatus for improving the operation of a computer processor by utilizing an asymmetric clustered processor architecture are disclosed. The asymmetric clustered processor apparatus includes a narrow cluster, a wide cluster, a steering logic utilizing a cluster predictor for providing a decoded instruction to either the narrow cluster or the wide cluster; address registers which are not part of the ISA, and a translation look-aside buffer for translating the virtual address of a load/store instruction in parallel with an execute stage. The method includes the steps of: predictably steering the instruction to either a W-bit Wide integer cluster or an N-bit Narrow integer cluster, managing the Address register file, and processing any instruction in the Wide integer cluster but processing only N-bit instructions in the Narrow integer cluster.

27 Claims, 7 Drawing Sheets

PREDICTION BASED INSTRUCTION STEERING TO WIDE OR NARROW INTEGER CLUSTER AND NARROW ADDRESS GENERATION

BACKGROUND OF THE INVENTION

The present invention generally relates to computer systems and, more specifically, to an asymmetric clustered processor architecture.

Most conventional clustered processor architectures are symmetric systems. It is known that the scalability of a high-performance processor architecture has been limited in new system designs by various factors, including increasing clock frequencies, issue widths, and greater wire delays. In addition, many high-performance processor families have extended their Instruction Set Architecture (ISA), or have introduced new ones, to handle 64-bit integers, which further exacerbates the above design factors.

Clustering is generally viewed as a possible solution to these problems. Clustered processors have many advantages, including improved implementation and scalability, reduced power consumption and potentially faster clock speed. However, a design difficulty is encountered in assigning instructions to clusters so as to minimize the effect of inter-cluster communication latency.

Figure 1:
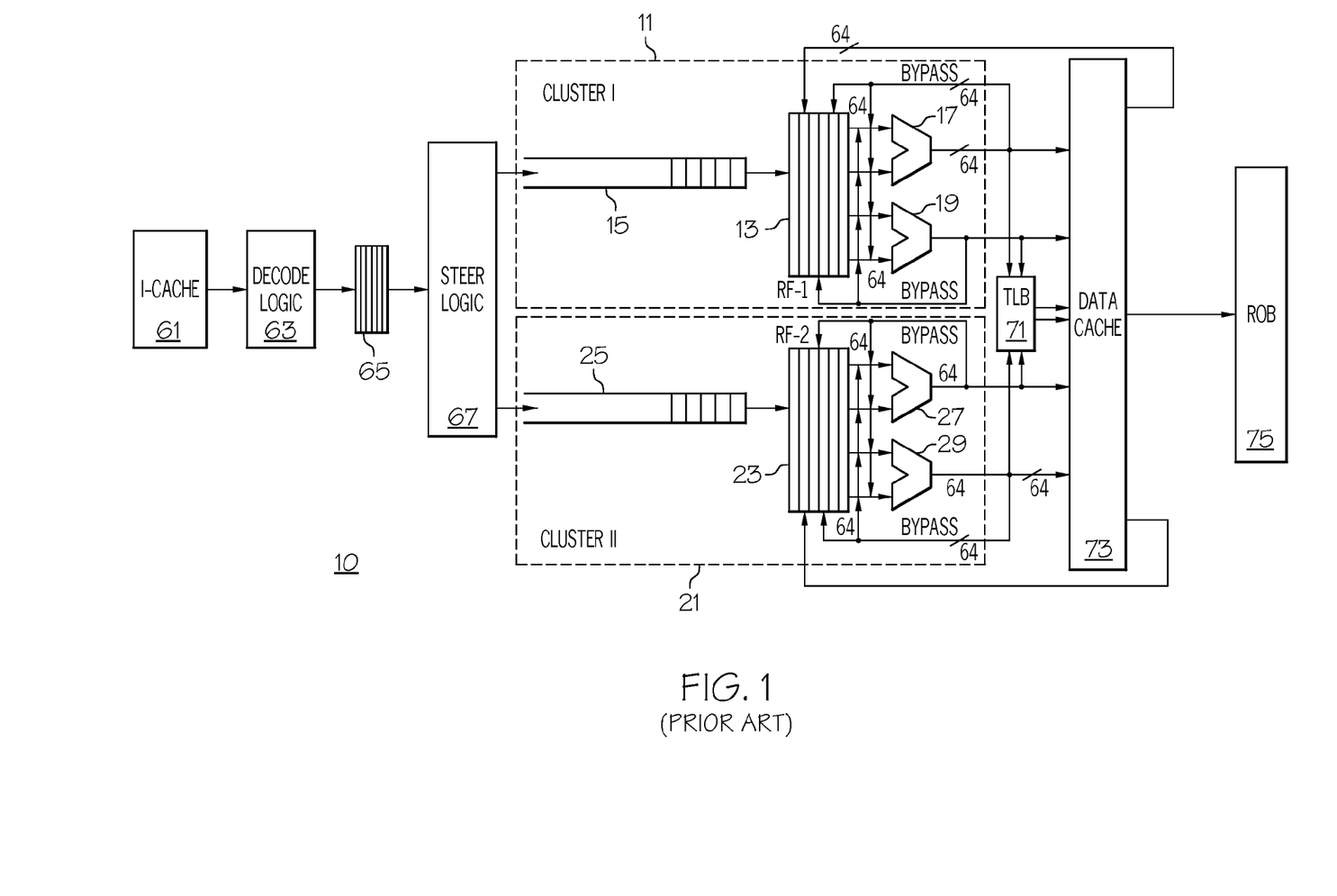
FIG. 1 is a diagram of a clustered processor organization including two symmetric integer clusters, according to the prior art.

There is shown in FIG. 1 a functional diagram of a conventional 64-bit clustered processor organization 10 with a 4-wide issue width and two integer clusters sharing a front end and a data cache. The conventional 64-bit clustered processor organization 10 may include a first conventional 64-bit integer cluster 11 and an essentially identical second conventional 64-bit integer cluster 21. A first 64-bit register file 13 in the first conventional 64-bit integer cluster 11 may be replicated in a second 64-bit register file 23 in the second conventional 64-bit integer cluster 21. Each "write" is sent to both a local register file and to a remote register file, with posting to the remote register file at least one clock cycle later than the posting to the local register file. The term "64-bit," as used herein, refers to the size of the operand of an instruction as generally understood in the relevant art.

The first conventional 64-bit integer cluster 11 may also include a first instruction queue 15, with a first pair of 64-bit arithmetic logic units (ALUs) 17 and 19, to provide a combined issue width of two integer instructions. Similarly, the second conventional 64-bit integer cluster 21 may also include a second instruction queue 25, and a second pair of 64-bit ALUs 27 and 29, for an issue width of an additional two integer instructions.

Figure 2:
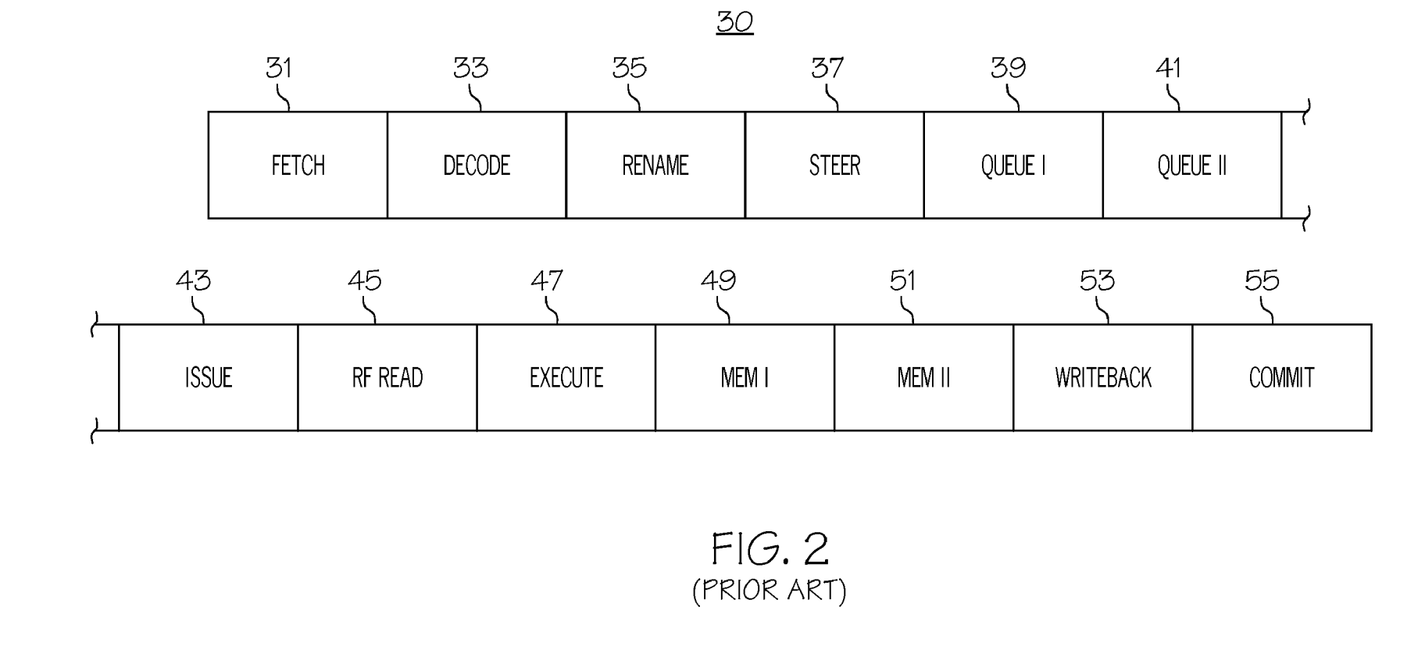
FIG. 2 is a representative diagram of a thirteen-stage baseline pipeline for the processor of FIG. 1, according to the prior art.

Operation of the conventional 64-bit clustered processor organization 10 may be described with additional reference to a baseline pipeline 30, shown in FIG. 2. An Instruction Fetch stage 31 may be executed by an instruction cache 61. The fetched instruction may move to a decode logic 63 for decoding at a Decode stage 33, and may be assigned physical registers via a rename logic 65 at a subsequent Rename stage 35. The fetched instruction may then enter either the first conventional 64-bit integer cluster 11 or the second conventional 64-bit integer cluster 13, in accordance with the steering.

Steering may be performed by a steering logic 67 after register renaming performed by the rename logic 65. The fetched instruction may pass through a first Queue stage 39 and a second Queue stage 41 to issue, followed by the Issue stage 43, from either the first instruction queue 15 or the second instruction queue 25. If the fetched instruction issues from the first instruction queue 15, the first 64-bit register file 13 receives the fetched instruction, at the Register File Read stage 45. Alternatively, if the fetched instruction issues from the second instruction queue 25, the second 64-bit register file 23 receives the fetched instruction, at the Register File Read stage 45.

For example, if a fetch instruction has been sent to the second register file 23, an instruction may proceed to either the 64-bit ALU 27 or the 64-bit ALU 29, at an Execute stage 47. The following Memory I stage 49, Memory II stage 51, and Write-Back stage 53, function largely as generally understood in the relevant art except for address translation in the Narrow cluster and for testing result value type. A Commit stage 55 functions as generally understood in the relevant art.

As can be appreciated, there is a need for an improved apparatus and method for accommodating the increasing clock frequencies, mitigating wire delays, and addressing the problem of issue widths in the past processor architecture designs.

SUMMARY OF THE INVENTION

In one aspect of the present invention, an asymmetric clustered processor organization comprises: one or more W-bit Wide integer clusters, the Wide integer cluster including a W-bit register file in communication with a first Wide ALU and with a second Wide ALU; one or more N-bit Narrow integer clusters, where N<W, the Narrow integer cluster including a N-bit register file in communication with an N-bit Narrow ALU; and a steering logic for sending an instruction to either one of the Wide integer clusters or one of the Narrow integer clusters.

In another aspect of the present invention, an N-bit Narrow integer cluster comprises: a Narrow Addr register file for outputting (W−N)-bit data values, where $32 \leq W \leq 64$ and N<W; an N-bit register file for outputting N-bit data values; a Narrow ALU for processing the N-bit data values; and a concatenation/sign extension operator for concatenating the N-bit data values with the (W−N)-bit data values and outputting W-bit data values.

In yet another aspect of the present invention, an asymmetric clustered processor organization comprises: a 64-bit Wide integer cluster, the Wide integer cluster including a 64-bit register file in communication with a first Wide ALU and with a second Wide ALU, the 64-bit register file configured to input 64-bit data values from the first Wide ALU and the second Wide ALU to the data cache and to output 64-bit data values to the first Wide ALU and the second Wide ALU; and a N-bit Narrow integer cluster including a N-bit register file in communication with a Narrow ALU, the N-bit register file configured to input N-bit data from the Narrow ALU and the data cache and to output N-bit data to the Narrow ALU, the Narrow integer cluster further including a (64−N)-bit Narrow Addr register file and a concatenation operator, the concatenation operator configured to concatenate N-bit data from the Narrow ALU with (64−N)-bit data from the Narrow Addr register file into 64-bit data for transmittal as an address to the data cache.

In yet another aspect of the present invention, a method for processing an instruction comprises: steering the instruction to a selected one of a W-bit Wide integer cluster or a N-bit Narrow integer cluster, where a data path width N is less than a data path width W, the steering action based on a predictive process; and if a W-bit instruction is steered to the Wide integer cluster, processing the W-bit instruction via a W-bit Wide ALU; if an N-bit instruction is steered to the Wide integer cluster, processing the N-bit instruction via the W-bit Wide ALU; if an N-bit instruction is steered to the Narrow integer cluster, processing the N-bit instruction via an N-bit Narrow ALU; if the W-bit instruction is steered to the Narrow integer cluster, replaying the W-bit instruction to the Wide integer cluster.

The present invention discloses an asymmetric architecture for clustered processors. The asymmetric design can provide an increase in Instructions executed per cycle (IPC) and can reduce hardware complexity and power consumption. The asymmetric clustered processor may include at least two different types of integer clusters and a new instruction steering algorithm, where one cluster type may be a standard 32-bit or 64-bit integer cluster and another cluster type may be a cluster with a more narrow datapath.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

In the present invention, an asymmetric clustered processor organization includes at least one Narrow integer cluster, a configuration that serves to increase the IPC and reduce power consumption, in comparison to a conventional 64-bit clustered processor organization utilizing only Wide integer clusters. The increased IPC results from the ability of the asymmetric clustered processor organization to execute most of the instructions including address computations as narrow, fast operations. The faster operation results from the use of a single narrow ALU in the Narrow integer cluster, an architecture that utilizes fewer ports on an instruction queue, in a register file, and uses a single, much shorter bypass network. The Narrow register file is more narrow than a conventional Wide register file and has fewer ports, making the Narrow register file physically smaller, so that its access time can be decreased. The narrow ALU with shorter bypass network is significantly faster allowing the clock rate to be increased, and the corresponding issue width reduced to about half that of a baseline cluster.

Moreover, the single ALU in the Narrow integer cluster may be less than half the size of a conventional ALU in a symmetric clustered processor organization, and the single ALU may be exempted from performing relatively slow operations such as "multiply." In addition, the bypass network in the asymmetric clustered processor organization will typically be less than half as wide and as much as six times shorter than a comparable bypass network in a 64-bit cluster using two 64-bit ALUs.

Figure 3:
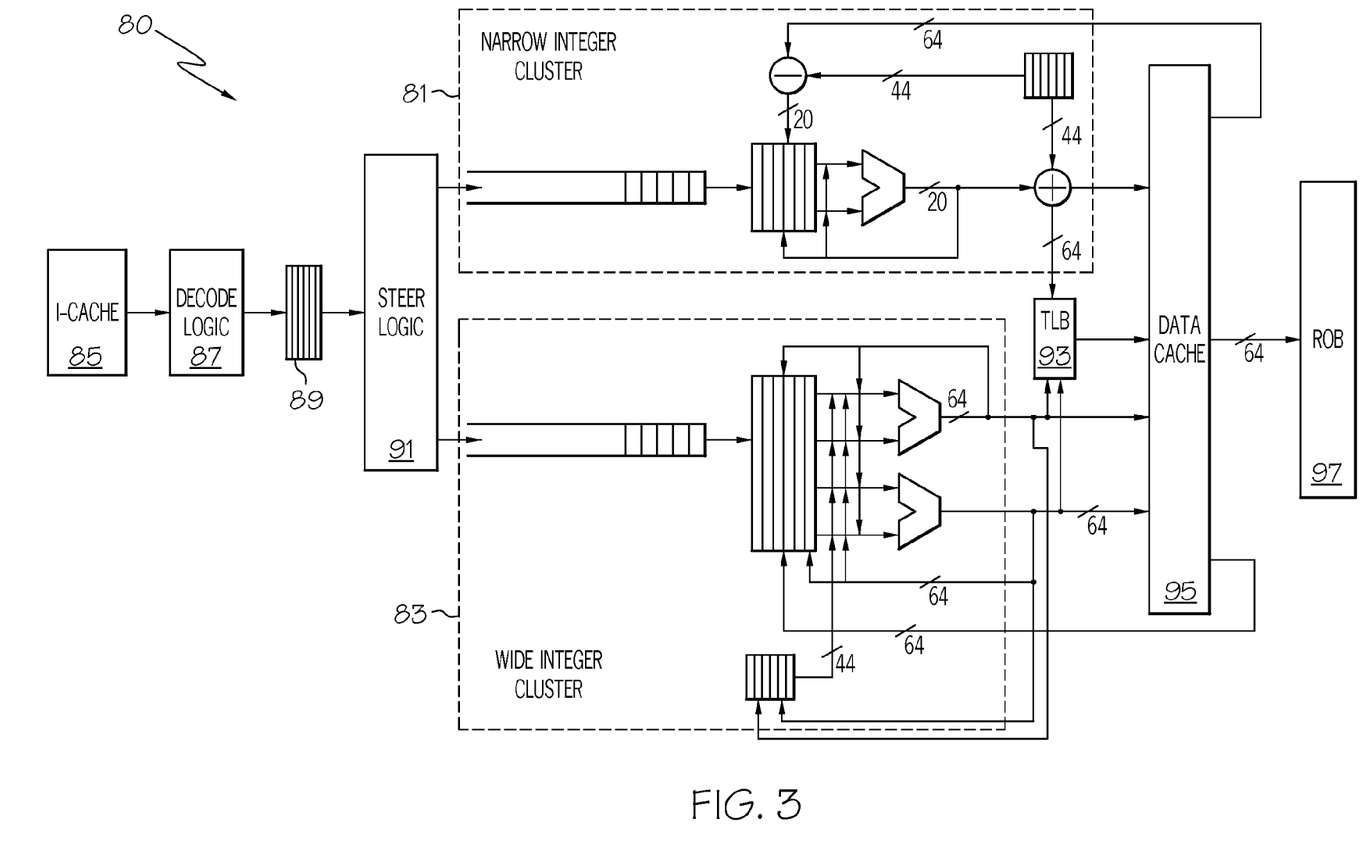
FIG. 3 is a diagram of an asymmetric clustered processor organization including a slow integer cluster and a fast integer cluster, in accordance with the present invention.

There is shown in FIG. 3 a functional diagram of an asymmetric clustered processor organization 80, in accordance with the present invention. The asymmetric clustered processor organization 80 may include at least one Narrow integer cluster 81 and at least one Wide integer cluster 83. In an exemplary embodiment, the Wide integer cluster 83 may be configured to process 64-bit instructions, and the Narrow integer cluster 81 may be configured to process 20-bit instructions. For convenience of illustration, only one Narrow integer cluster 81 is shown and is herein referred to as a 20-bit cluster, and only one Wide integer cluster 83 is shown and is referred to as a standard, 64-bit cluster.

However, it should be understood that the present invention is not limited to this configuration and that the Narrow integer cluster 81 may have a wider or a more narrow datapath architecture. In particular, the Narrow integer cluster 81 may comprise an N-bit datapath architecture, where $4 \leq N \leq 32$ (e.g., 8-bit, 12-bit, 16-bit, or 32-bit) and the Wide integer cluster 83 may comprise a W-bit datapath architecture, where $32 \leq W \leq 64$. See, for example, R. González et al., "*An Asymmetric Clustered Processor based on Value Content,*" 2005 Intl. Conference on Supercomputing, incorporated herein in entirety by reference.

A fetched instruction may be provided to either the Narrow integer cluster 81 or the Wide integer cluster 83 via pipelined actions performed by an instruction cache 85, a decode logic 87, a register rename logic 89, and a steering logic 91, as described in greater detail below. W-bit addresses may be output from the Narrow integer cluster 81 via a level-1 transition look-aside buffer (L1-TLB) 93 to a data cache 95, as described in greater detail below.

The choice of a 20-bit datapath over a smaller datapath, for example, a 16-bit datapath, serves to increase the number of instructions steered to the Narrow integer cluster 81. In general, the datapath width can be selected to achieve a desired instruction distribution between clusters via the steering logic as well as improving the ALU speed. Such steering may be based on a predictive process (i.e., prediction based steering) since the operand value type of the steered instruction may not be known to the steering logic 91.

A PC-indexed, history-based steering predictor (not shown) may be used in the asymmetric clustered processor organization 80. For each decoded instruction, a cluster prediction is made based on previous execution of the same instruction. The predictor may comprise an array of 1-bit entries, with each entry recording which cluster had been the correct choice for a given instruction the last time the instruction was executed. The predictor may be updated in the Write-Back stage 53 for every instruction. In addition, a tag-less predictor design can be used for greater accuracy and faster operation, and an initial value for each predictor entry can be set to point to the Wide integer cluster 83 to minimize mis-prediction.

In an exemplary embodiment, the predictor outcome may be a function of the data path width "N" in the Narrow integer cluster 81 such that a greater proportion of instructions are steered to the Narrow integer cluster 81 as the data path width in the Narrow integer cluster 81 is increased. It can be appreciated that the use of a predictor having the above characteristics is not limited to the asymmetric clustered processor organization 80 but can be advantageously used with other asymmetric cluster designs or with conventional symmetric cluster designs.

Essentially, any instruction assigned to the Wide integer cluster 83 can execute in the Wide integer cluster 83. However, as can be appreciated by one skilled in the relevant art, the prediction-based steering in an asymmetric clustering architecture may occasionally produce a "mis-prediction" by assigning an instruction with a 64-bit source operand or a 64-bit result to the Narrow integer cluster 81. A mis-prediction in the Narrow integer cluster 81 incurs an operational time penalty as the mis-predicted instruction may need to replay from the scheduling step in the Wide integer cluster 83. Recovery from a mis-assigned instruction sent to the Narrow integer cluster 81 may be performed by replaying the mis-assigned instruction to the Wide integer cluster 83 and subsequently updating the steering predictor and the destination register (not shown). Replay may be accomplished by directly sending the payload of the mis-assigned instruction to the Wide integer cluster 83.

Figure 4:
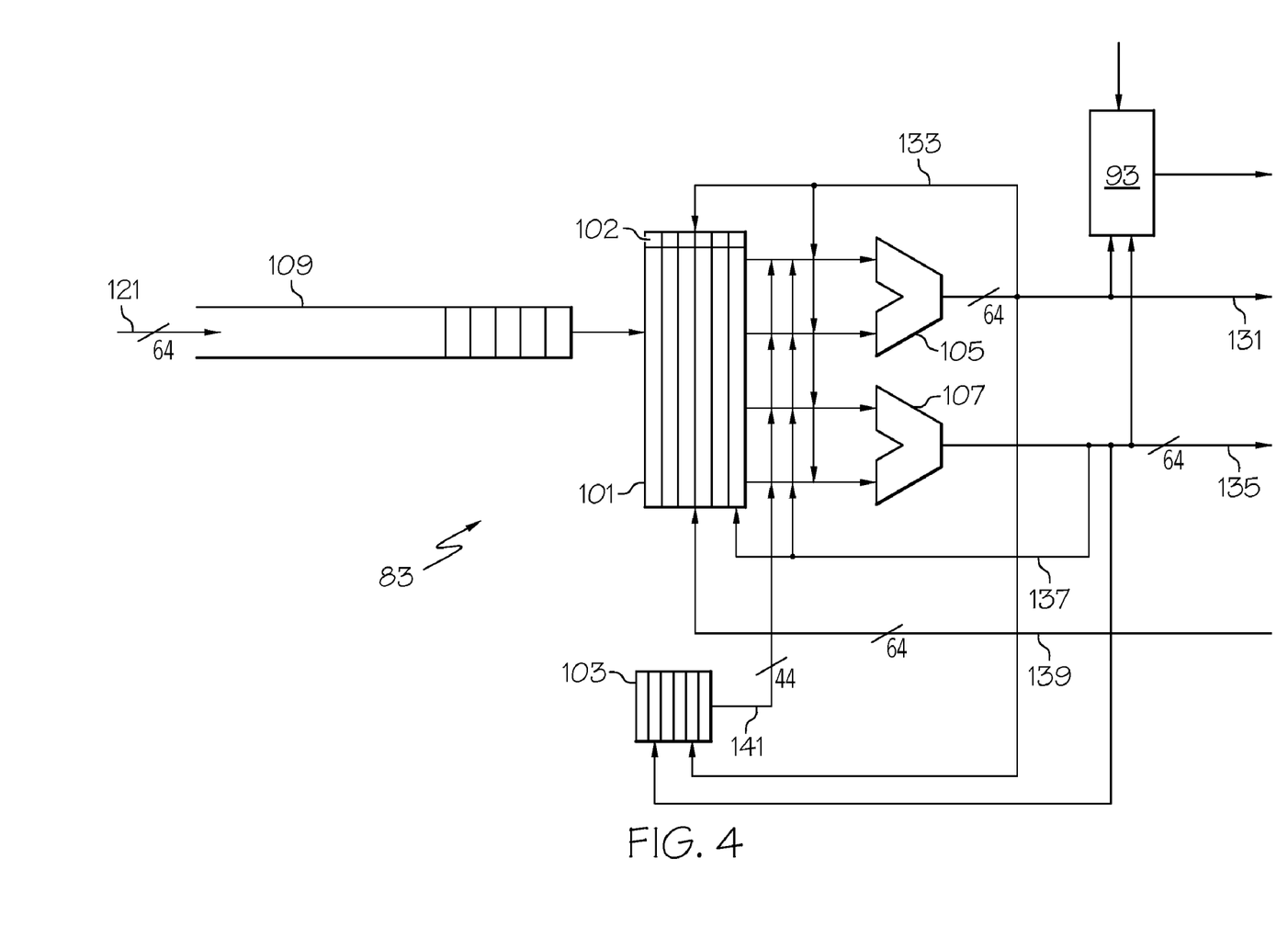
FIG. 4 is a diagram of the slow integer cluster of FIG. 3, in accordance with the present invention.

The Wide integer cluster 83, shown in FIG. 4, may include a W-bit register file 101. In an exemplary embodiment, the W-bit register file 101 may comprise a 128-entry physical register file. A Wide instruction 121, provided by the steering logic 91 (see FIG. 3), may enter a Wide instruction queue 109 for transmittal to the W-bit register file 101. The W-bit register file 101 may be associated with a Wide Addr register file 103, which may not be part of the ISA. The Wide Addr register file 103 may store (i.e., replicate) an upper part of a full memory address, with a Wide Register Descriptor 102 set to indicate this. The upper and lower parts of the full memory address are stored in the W-bit register file 101.

The Wide Addr register file 103 may contain a "valid" bit, a "used" bit, and an associated logic (not shown) to determine when to store an upper part of a full memory address as an entry in the Wide Addr register file 103. This may involve a replacement decision as to whether a Wide Addr register file entry to be used contains a valid value. The logic also determines if a Wide register can be re-classified to an Addr register, that is, whether an RD descriptor value can be changed to "Addr" in both the Wide integer cluster 83 and the Narrow integer cluster 81. In the Narrow integer cluster 81, the low-order bits are then also stored in the Narrow Addr register file 113.

Generally, an Addr Test may be used to determine if an Addr register is to be written with a new value or if just a (Wide) register's descriptor needs to be changed to Addr. The Addr Test may be applied only to data in a Wide (64-bit) register which is a base register of a Load or Store instruction. The Addr Test compares the upper 44-bit part of the Wide register with a value in a corresponding valid Addr register. The valid Addr register may be indexed (assuming an 8-entry Addr register file) using bits 19-17 in the Wide register as a pointer into the corresponding Wide Addr register file. If the upper 44-bit part of the Wide register is equal to the value in a corresponding valid Addr register, then the Wide register descriptor RD is changed to Addr. A copy of the low order part is also written to the Narrow file so that it can be used in the fast cluster for future instances of this Load/Store. The steering predictor is updated to send this Load/Store to the fast cluster in the future.

However, the Addr Test may fail for either of two reasons. First, the corresponding Addr register may have been not valid, in which case it is written with the upper part of the Wide register and marked valid. This is how Addr registers become valid and the only way they are written. The Wide register descriptor is also marked Addr. In this case, the update is propagated to the Narrow file and the steering predictor is updated. Second, the corresponding Addr register may have been valid but the equality test failed. In the second case a replacement policy is used which attempts to keep the more frequent of the two addresses.

The replacement may occur in two ways. One, the "use" bit tracks whether the Wide Addr register has been used since it was written. A valid entry that has not been used is replaced. Two, a "background" algorithm frees entries that have not been used for a while. An entry that was marked used, but which has not been accessed for a period proportional to two times the number of entries in a re-order buffer 97, is marked invalid (i.e., is freed).

In an exemplary embodiment, the Wide Register Descriptor 102 may comprise a two-bit field that may have a value type of Wide, Narrow, or Addr. The W-bit register file 101 may output data to a first Wide ALU 105 and to a second Wide ALU 107. The first Wide ALU 105 may issue data to the data cache 95 and to the L1-TLB 93 via a first 64-bit output path 131. A first 64-bit bypass path 133 may be provided between the output of the first Wide ALU 105 and the inputs of the first and second Wide ALU 105. The second Wide ALU 107 may issue data to the data cache 95 via a second 64-bit output path 135. A second 64-bit bypass path 137 may be provided between the output of the second Wide ALU 107 and the inputs of the first Wide ALU 105 and the second Wide ALU 107. The Wide integer cluster 83 may include a 64-bit Wide write-back path 139 from the data cache 95 to the W-bit register file 101, and an optional 44-bit Wide Addr path 141 from the Wide Addr register file 103 to the first Wide ALU 105 and to the second Wide ALU 107 as shown.

Figure 5:
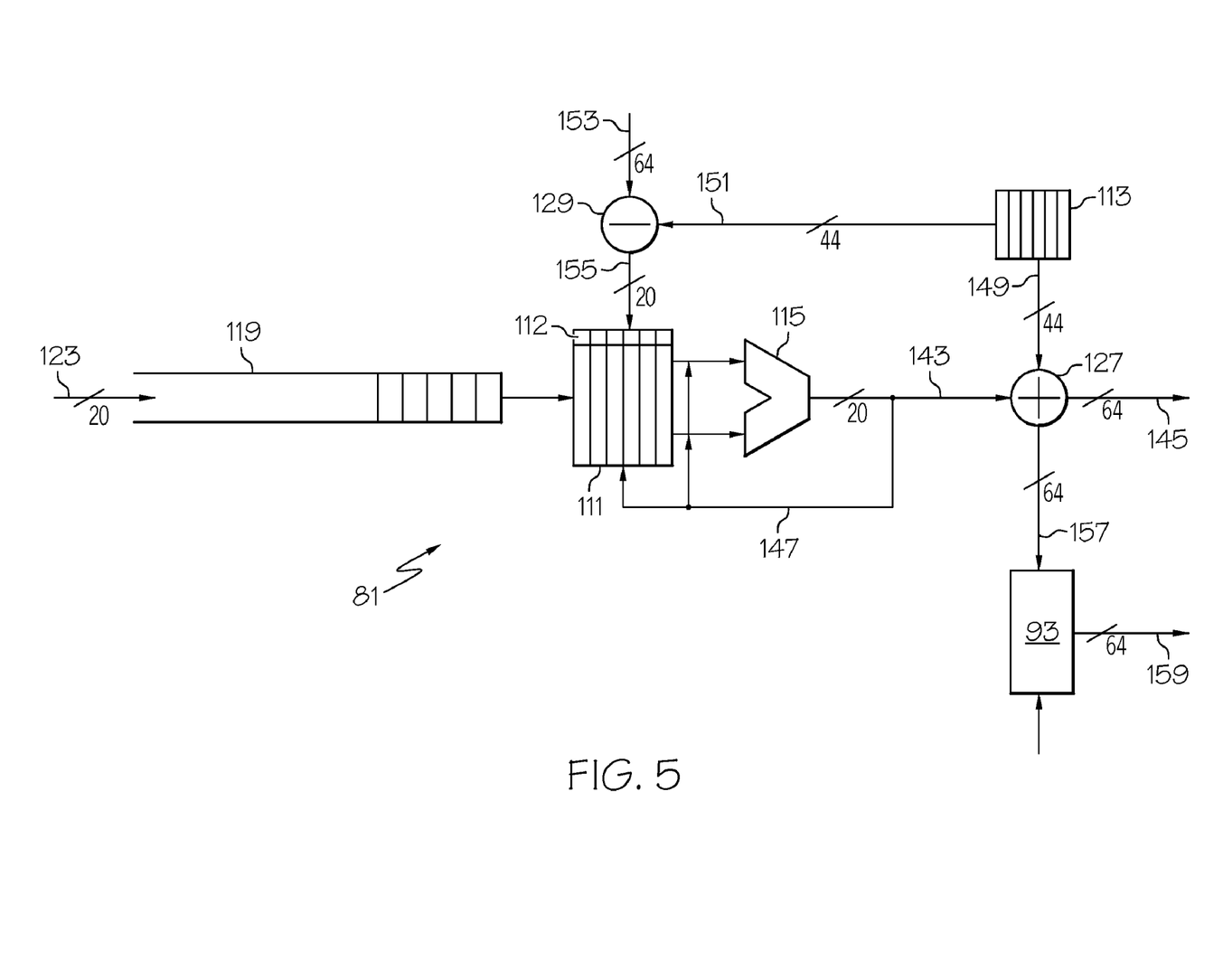
FIG. 5 is a diagram of the fast integer cluster of FIG. 3, in accordance with the present invention.

The Narrow integer cluster 81, shown in FIG. 5, may include a N-bit register file 111. In an exemplary embodiment, the N-bit register file 111 may comprise a 128-entry physical register file. A Narrow instruction 123, provided by the steering logic 91 (see FIG. 4), may enter a Narrow instruction queue 119 for transmittal to the N-bit register file 111. The N-bit register file 111 may be associated with a Narrow Addr register file 113.

The Narrow Addr register file 113 may store an upper part of a full memory address with a lower part stored in the N-bit register file 111 with a Narrow Register Descriptor 112 set to indicate this stored data. The Narrow Addr register file 113 is a replicated version of the Wide Addr register file 103 (see FIG. 4). Both the Narrow Register Descriptor 112 and the Wide Register Descriptor 102 may be updated during a "write" operation. The N-bit register file 111 may output Narrow data to a Narrow ALU 115 and to a concatenation/ sign extension operator 127 via a 20-bit output path 143. The N-bit register file may be configured to input and to output 20-bit instruction operand data to the Narrow ALU 115.

The concatenation/sign extension operator 127 functions to combine the 44-bit content of the Narrow Addr register file 113 with a 20-bit word from the Narrow ALU 115 to form a 64-bit data address and send it to the L1-TLB 93 via a third 64-bit output path 157. A 20-bit word from the Narrow ALU 115 can also be sign-extended by the concatenation/sign extension operator 127 and the resulting 64-bit value sent to data cache 95 via the output path 145. A 20-bit bypass path 147 may be provided between the output of the Narrow ALU 115 and the inputs of the Narrow ALU 115 and of the register file 112.

Data values from the Narrow Addr register file 113 may be provided to the concatenation/sign extension operator 127 via a first 44-bit Addr path 149 and to a truncation/sign compression operator 129 via a second 44-bit Addr path 151. The truncation/sign compression operator 129 functions to shorten by 44 bits the 64-bit data provided via a 64-bit Narrow write-back path 153 from the data cache 95 to the truncation/sign compression operator 129. The 64-bit data may be shortened by splitting off the 44-bit content of the Narrow Addr register file 113 or by splitting of the top 44-bit all-0 or all-1 value. The resulting 20-bit Narrow data value may be sent from the truncation/sign compression operator 129 to the N-bit register file 111 via a 20-bit write-back path 155. Wide addresses may also be sent to the L1-TLB 93 from the concatenation/sign extension operator 127 via a 64-bit TLB path 157 and subsequently to the data cache 95 via a 64-bit TLB output path 159.

Each "write" is sent to both the W-bit register file 101 and to the N-bit register file 111, where posting to the more remote file may be at least one clock cycle later than the posting to the local file. A "write" from the N-bit register file 111 to the W-bit register file 101 may be performed with sign extension. The Wide Register Descriptor 102 and the Narrow Register Descriptor 112 may also be updated during a "write." The Wide Register Descriptor 102 and the Narrow Register Descriptor 112 can be used to determine the type of data value stored (i.e., Wide, Narrow, or Addr) in the respective register file. In addition, 'n' bits of an address value in the W-bit register file 101 can be used as a pointer to the Wide Addr register file 103, where n=$\log_2$ K and K is the number of entries in the Wide Addr register file 103. Similarly, 'n' bits of an address value in the N-bit register file 111 can be used as a pointer to the Narrow Addr register file 113.

Figure 7:
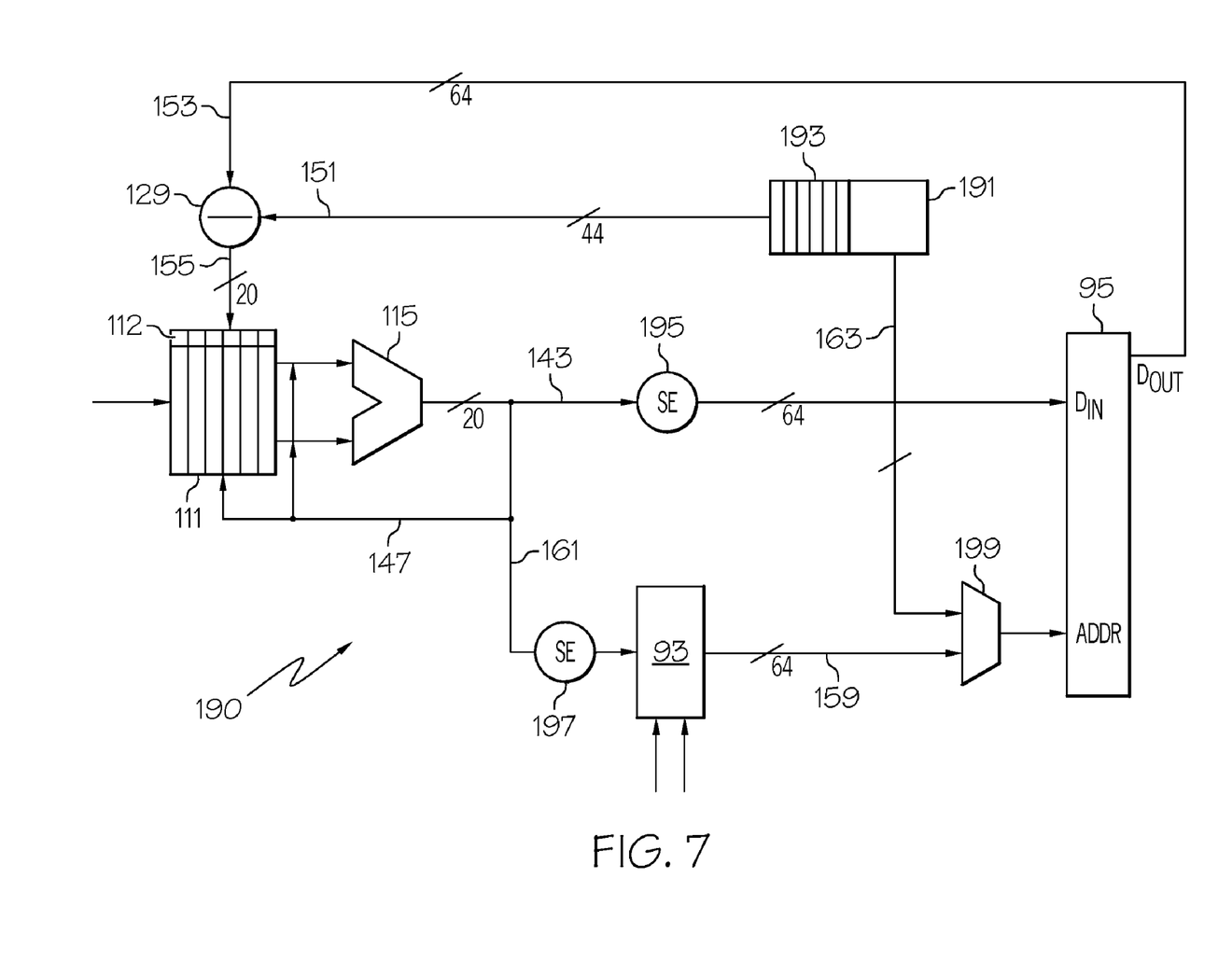
FIG. 7 is an alternative embodiment of the fast integer cluster of FIG. 3, in accordance with the present invention.

In an exemplary embodiment of an alternate Narrow integer cluster 190, partially shown in FIG. 7, a Narrow Addr register file 193 may include a level-0 transition look-aside buffer (L0-TLB) 191 that may be indexed by a pointer in the Narrow Addr register file 193. As each entry is added to the Narrow Addr register file 193, a copy of the page attributes and the physical address translation can be stored in the L0-TLB 191. That is, the L0-TLB 191 can be direct mapped. Because both the L0-TLB 191 and the Narrow Addr register file 193 may be accessed in the Execute stage 47 (see FIG. 2), the physical address translation may be available in the L0-TLB 191 at the end of the Execute stage 47. This attribute enables the L0-TLB 191 to function as a zero-delay TLB.

The Narrow integer cluster 190 may include the N-bit register file 111 to output Narrow data to a first sign extension operator 195 from the Narrow ALU 115 via the 20-bit output path 143. The first sign extension operator 195 may input 64-bit data to a data-in port (DIN) in the data cache 95. The Narrow ALU 115 may also input data to a second sign extension operator 197 via a second 20-bit output path 161. The L1-TLB 93 may receive data from the second sign extension operator 197, the first Wide ALU 105, and the second Wide ALU 107 (see FIG. 3) and output data to a multiplexer 199 via the 64-bit TLB output path 159.

The L0-TLB 191 may also output data to the multiplexer 199 via a second 64-bit TLB output path 163. The multiplexer 199 selects data from either the L0-TLB 191 or from the L1-TLB 93 for input to an Addr port in the data cache 95. A data-out port (DOUT) in the data cache 95 may communicate with the truncation/sign compression operator 129 via the 64-bit Narrow write-back path 153.

When a new result is placed into the W-bit register file 101, shown in FIG. 4, the value of the new result may be checked to determine if it is a Wide value, 64 bits for example, or a Narrow value (e.g., 20 or fewer significant bits). In the latter case, the Narrow value may also be written to the N-bit register file 111, otherwise only a descriptor is updated in the Narrow file. Each result may also be checked to determine if the result value can be written to the Narrow Addr register file 113 and its type denoted as "Addr."

Load/store (Ld/St) address computations may preferably be executed in the Narrow integer cluster 81, shown in FIG. 5. This may be accomplished by finding frequently used, invariant 44-bit high-order bits in Ld/St base registers (not shown). The high-order bits may be stored in the Narrow Addr register file 113, and the remaining low-order bits may be sent to the N-bit register file 111. The Ld/St base address register may also be stored in the W-bit register file 101 as a 64-bit value, with an Addr descriptor in the Wide Register Descriptor 102 and the higher-order bits from the Ld/St base address register stored in the Wide Addr register file 103.

As can be appreciated by one skilled in the relevant art, the Narrow cluster 81 in the asymmetric clustered processor organization 80, in FIG. 3, can be a functional replacement for a conventional 64-bit integer cluster in the conventional 64-bit clustered processor organization 10, in FIG. 1. One objective for the present inventive design is to increase performance in a processor organization by implementing the Narrow cluster 81 to reduce delays. In particular, for a N-bit register file 111 having a width of up to thirty-two bits, the single-issue Narrow cluster 81 can potentially run at twice the clock rate of the Wide cluster 83, for reasons stated above.

It is known that many integer operand values may be "small" or may contain many all-0 high-order bits or all-1 high-order bits. A 64-bit architecture, for example, may typically execute approximately half of all integer instructions using a 16-bit arithmetic logic unit. It is also known that a large number of 64-bit address values have a common, invariant high-order part, and that operand types used by an instruction may typically all be the same. That is, the operand types may comprise only "wide" 64-bit values, or may comprise only "narrow" values of thirty-two or fewer bits. See, for example, R. González et al., "*A Content Aware Integer Register File Organization,*" 31$^{st}$ ISCA, June 2004, incorporated herein in entirety by reference. This realization is advantageously exploited in the present, innovative apparatus and method.

Operation of the asymmetric clustered processor organization 80 generally follows the stages of the baseline pipeline 30, shown in FIG. 2. However, in the Narrow integer cluster 81 and in the Wide integer cluster 83, the Issue stage 43, the Register File Read stage 45, the Execute stage 47, and the Write-Back stage 53 may run at a faster clock rate than the conventional 64-bit clustered processor organization 10.

The cluster predictor (not shown) may be accessed to hide the predictor access latency as early as the Instruction Fetch stage 31. The Decode stage 33 and the Rename stage 35 may assign a Narrow/Wide register entry to logical registers and may re-check the steering prediction. At the Steering stage 37, only the actual steering may be performed as the steering decision has already been made.

In the Issue stage 43, a register written to a first cluster from a second cluster may cause wakeup in the first cluster. For example, an instruction in the Narrow integer cluster 81 may be awaken by a register "write" in the Wide integer cluster 83. In the case when a Wide value is written, only a register descriptor RD, but not the value, are sent from the Wide integer cluster 83 to the Narrow integer cluster 81—because the value will not fit into the Narrow integer cluster 81. Otherwise, when a Narrow value is written, the Narrow value may be sent from the Narrow integer cluster 81 to the Wide integer cluster 83. In the Register File Read stage 45, the Register Descriptor and the Addr register pointer are read. If a Wide type is read in the Narrow integer cluster 81, a mis-prediction flag is set (not shown) to mark the mis-assigned instruction.

In the Execute stage 47, the Wide Addr register file 103 and the Narrow Addr register file 113 are read in parallel with operation of the first Wide ALU 105, the second Wide ALU 107, and the Narrow ALU 115, shown in FIG. 3. An overflow in the Narrow integer cluster 81 may set a mis-prediction flag. In the Write-Back stage 53, the steering predictor (not shown) may be updated, and "writes" may be posted to replicated register files. For the Narrow integer cluster 81, a "write" is initiated only if a mis-prediction flag was not set. If the mis-prediction flag was set, a "write-back" is prevented and a replay is initated.

Write-back in the Wide integer cluster 83 may include a "wakeup" to the Narrow integer cluster 81. A register descriptor update and write to the Narrow integer cluster 83 may be initiated, if indicated by either of the following conditions: (i) if the result in the Wide integer cluster 83 is a Narrow value (i.e., the upper bits 63 to 20 are all "0" or all "1"), the Narrow value is written to the Narrow integer cluster 81, or (ii) if the result in the Wide integer cluster 83 is an Addr value, the Addr value is written to the Narrow integer cluster 81. The result in the Wide ALU 105, the result in the Wide ALU 107, and any value fetched from memory may be checked to see if the above-mentioned conditions (i) and (ii) hold.

Figure 6:
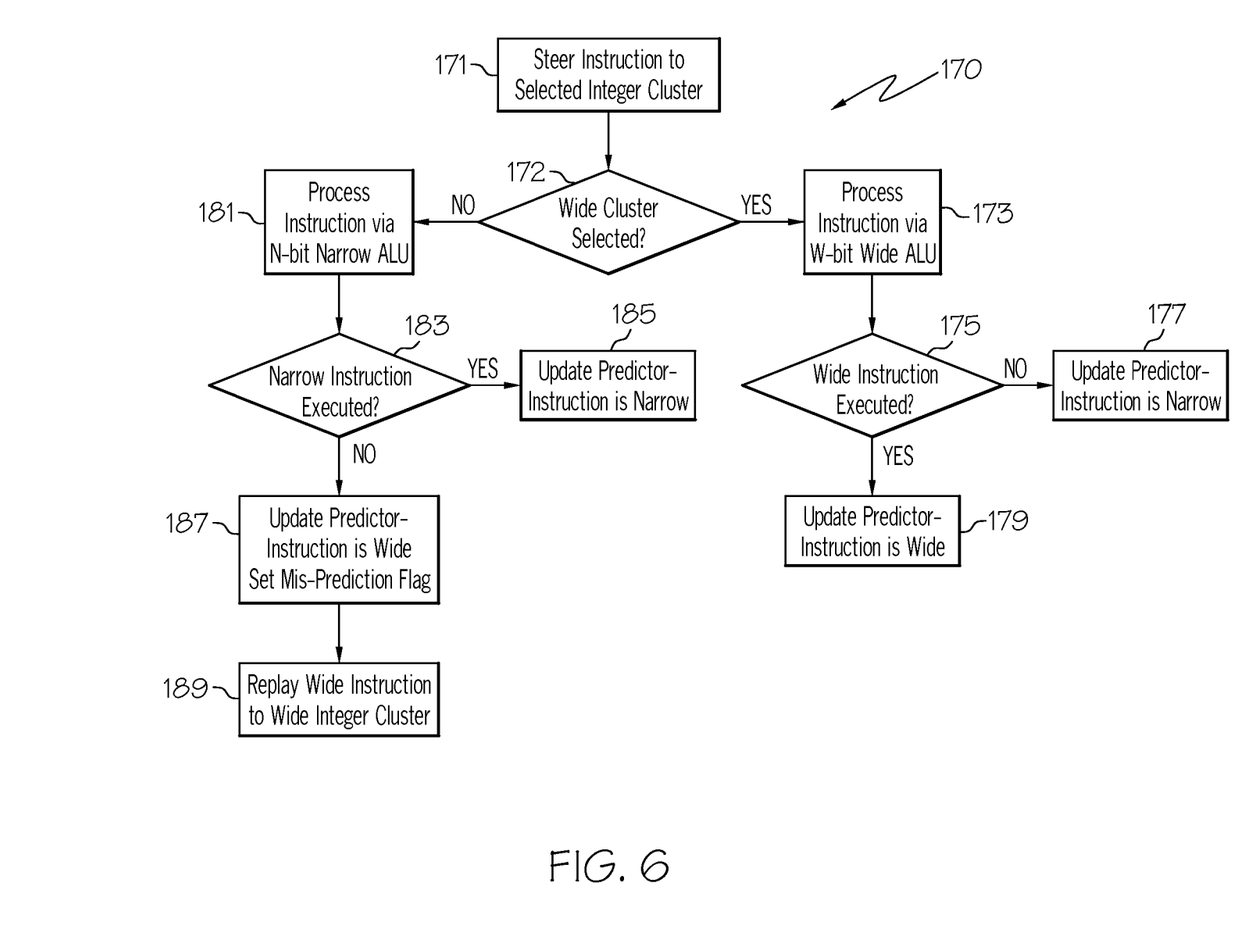
FIG. 6 is a flowchart illustrating operation of the asymmetric clustered processor organization of FIG. 3, in accordance with the present invention.

The process by which the Wide integer cluster and the Narrow integer cluster operate to process an instruction can be described with reference to a flow diagram 170 in FIG. 6. The steering logic 91 may steer the instruction to a selected one of the N-bit Narrow integer cluster 81 or the W-bit Wide integer cluster 83, at step 171. As described above, the selection of either the Narrow integer cluster 81 or the Wide integer cluster 83 may be based on a predictive process.

If the steering logic 91 makes the determination to send the instruction to the Wide cluster, at decision block 172, the instruction is processed by one of the Wide ALU 105 or the Wide ALU 107, at step 173. After the instruction has executed, a determination is made as to whether the instruction was a Wide (i.e., W-bit) instruction or a Narrow (i.e., N-bit) instruction, at decision block 175. If the processed instruction was a Narrow instruction, the predictor is updated to identify the processed instruction as a Narrow instruction, at step 177. If the processed instruction was a Wide instruction, the predictor is updated to identify the processed instruction as a Wide instruction, at step 179.

If the steering logic 91 makes the determination to send the instruction to the Narrow cluster, at decision block 172, the instruction is processed by the Narrow ALU 115, at step 181. After the instruction has executed, a determination is made as to whether the instruction was a Narrow instruction or a Wide instruction, at decision block 183. If the processed instruction was a Narrow instruction, the predictor is updated to identify the processed instruction as a Narrow instruction, at step 185. If the processed instruction was a Wide instruction, the predictor is updated to identify the processed instruction as a Wide instruction, at step 187. A mis-prediction flag may optionally be set. The mis-predicted Wide instruction is replayed to the Wide integer cluster 83, at step 189.

It can be appreciated by one skilled in the art that most asymmetric clustered processors can perform the majority of calculations in the Narrow cluster alone. Accordingly, this concept can be extended to an asymmetric clustered processor organization having more than two clusters, with one or more clusters being a Narrow cluster and/or one or more clusters being Wide clusters. For a configuration in which the asymmetric clustered processor organization comprises two Narrow clusters or two Wide clusters, the issue width of both Narrow clusters need not be the same and, similarly, the issue width of the two Wide clusters need not be the same.

It can be further appreciated that the disclosed asymmetric register file design requires only narrow-value communication between clusters. During the process of copying values between a Wide register file and a Narrow register file to insure consistency between register files, only the smaller bit count (twenty bits in the above example) needs to be copied rather than the standard bit count (64 bits in the above example). This provides an operating advantage as fewer conductive paths and less energy is required. The Narrow Addr register file 113 in the Narrow cluster 81 is written with 64-bit values from the Wide cluster only. Moreover, the prediction that utilizes address content locality can be used with other processor designs and may enable the 0-latency address translation that can be achieved for a majority of memory accesses.

Asymmetric clustering according to the present invention can offer further opportunities to optimize clustered microarchitectures. The disclosed design provides an aggressive cycle time reduction in the Narrow cluster allowing a corresponding reduction in the number of ALUs and the issue width while the 64-bit Wide cluster remained unchanged. An alternative embodiment for the Narrow cluster is to use two ALUs, but without a faster clock speed. This still offers the benefit of a large area and power reduction compared to a dual-issue 64-bit wide cluster and may still allow a faster clock speed.

In addition to the narrow cluster design alternatives described above, the 64-bit Wide cluster can also be optimized. For example, the 64-bit Wide cluster can be implemented with a 32-bit datapath only, or the issue width and the clock speed in the Wide cluster can be varied separately from the issue width and the clock speed in the Narrow cluster. The complexity-effective design of the Wide cluster is particularly attractive in the asymmetric architecture of the present invention where a dual-issue 64-bit cluster provides only a marginal performance improvement over a single-issue 64-bit cluster.

This is in large part due to the fact that approximately 15% of all integer instructions, on average, require 64-bit execution. Such an alternative wide cluster implementation according to the present invention can be enabled by asymmetric clustering and can lead to even further reduction in area, wire length, and power consumption. Some of these alternatives may also allow a faster 64-bit datapath and possibly reduce the overall clock cycle time, e.g. via the issue width and/or datapath width reduction in the wide cluster.

Furthermore, the asymmetric architecture according to the present invention may provide yet another approach to memory hierarchy optimization. L0TLB 191 access in the Narrow integer cluster 190, shown in FIG. 7, can be overlapped with (partial) address computation, an action that not only reduces L1 data cache latency, but also significantly reduces the TLB power consumption. Asymmetric architecture of the present invention may also be a very attractive alternative approach to building a 2-level TLB that does not suffer the performance penalty of a standard 2-level TLB. It has been observed that a small L0-TLB can be utilized for about 89% of all load/store instructions. This may indicate that a memory hierarchy can be further optimized using such an approach to allow faster TLB access within a Narrow integer cluster.

It should be understood, of course, that the foregoing relates to exemplary embodiments of the invention and that modifications may be made without departing from the spirit and scope of the invention as set forth in the following claims.

We claim:

1. An asymmetric clustered processor organization comprising:
   a W-bit Wide integer cluster, said Wide integer cluster including a W-bit register file in communication with a first Wide arithmetic logic unit and with a second Wide arithmetic logic unit;
   a N-bit Narrow integer cluster, where N<W, said Narrow integer cluster including a N-bit register file in communication with at least one Narrow arithmetic logic unit; and
   a prediction-based steering logic for sending an instruction to one of said Wide integer cluster or said Narrow integer cluster.

2. The asymmetric clustered processor organization of claim 1 wherein:
   32≦W≦64; and
   the narrow integer cluster operates with a first clock speed greater than a second clock speed at which the wide integer cluster operates.

3. The asymmetric clustered processor organization of claim 2 wherein 4≦N≦32.

4. The asymmetric clustered processor organization of claim 1 further comprising a level-1 translation look-aside buffer in communication with said Narrow integer cluster.

5. The asymmetric clustered processor organization of claim 1 wherein said Wide integer cluster further comprises a Wide Addr register file in communication with said first Wide arithmetic logic unit and with said second Wide arithmetic logic unit.

6. The asymmetric clustered processor organization of claim 1 wherein said W-bit register file comprises a Wide Register Descriptor, said Wide Register Descriptor including a two-bit field having one of a plurality of value types.

7. The asymmetric clustered processor organization of claim 1 wherein said Narrow integer cluster further comprises a Narrow Addr register file and a concatenation/sign extension operator, said concatenation/sign extension operator functioning to produce a W-bit value from a (W−N)-bit value in said Narrow Addr register file and an N-bit output from said Narrow ALU.

8. The asymmetric clustered processor organization of claim 1 wherein said Narrow integer cluster further comprises a Narrow Addr register file and a truncation/sign compression operator, said truncation/sign compression operator functioning to produce an N-bit value from a (W−N)-bit value in said Narrow Addr register file and a W-bit value inputted to said truncation operator, said sign compression operator further functioning to produce said N-bit value by compressing (W−N+1) sign bits to one bit.

9. The asymmetric clustered processor organization of claim 1 further comprising a Narrow Addr register file and a direct-mapped L0 translation look-aside buffer, such that when an entry is added to said Narrow Addr register file, a copy of said entry page attributes and physical address translation is stored in said direct-mapped translation look-aside buffer.

10. An asymmetric clustered processor organization comprising:
    at least one W-bit Wide integer cluster, each said Wide integer cluster including a W-bit register file in communication with a first Wide arithmetic logic unit and with a second Wide arithmetic logic unit, said W-bit register file configured to input W-bit operand specifiers and to output 64-bit data values to an arithmetic logic unit or to a W-bit register file via said first Wide arithmetic logic unit and second Wide arithmetic logic unit; and
    at least one 20-bit Narrow integer cluster including a N-bit register file in communication with a Narrow arithmetic logic unit, each said N-bit register file configured to input operand specifiers and to output 20-bit data to said Narrow arithmetic logic unit, each said Narrow integer cluster further including a 44-bit Narrow Addr register file and a concatenation operator, said concatenation operator configured to concatenate 20-bit data from said Narrow arithmetic logic unit with 44-bit data from said Narrow Addr register file into a 64-bit address for transmittal to said data cache.

11. The asymmetric clustered processor organization of claim 10 wherein at least one of said at least one Wide integer clusters further comprises a 44-bit Wide Addr register file, said Wide Addr register file being a replicated version of said Narrow Addr register file.

12. An asymmetric clustered processor organization comprising:
    a W-bit register file configured to output values having a maximum width of W-bits to a Wide arithmetic logic unit, said Wide arithmetic unit operating at a first clock speed;
    a N-bit register file configured to output values having a maximum width of N-bits to a Narrow arithmetic logic unit, where N<W, said Narrow arithmetic unit operating at a second clock speed, where said second clock speed is greater than said first clock speed;
    a concatenation/sign extension operator in communication with said Narrow arithmetic logic unit, said concatenation/sign extension operator configured to concatenate values from said Narrow ALU with data from a Narrow Addr register file into values having a maximum width of W-bits, said Narrow Addr register file storing data having a maximum width of less than W-bits;
    a data cache in communication with said Narrow arithmetic logic unit and said concatenation/sign extension operator for receiving addresses having a maximum width of W-bits, said data cache further in communication with said Narrow arithmetic logic unit and said concatenation/sign extension operator for receiving data results having a maximum width of W-bits; and
    a steering logic in communication with said W-bit integer cluster for providing instructions having a maximum width of W-bits, said steering logic further in communication with said N-bit integer cluster for providing instructions having a maximum width of N-bits.

13. The asymmetric clustered processor organization of claim 12 wherein said Wide integer cluster further comprises a Wide Addr register file, said Wide Addr register file being a replicated version of said Narrow Addr register file.

14. The asymmetric clustered processor organization of claim 12 wherein said steering logic communicates with said N-bit Narrow integer cluster via a Narrow instruction queue.

15. The asymmetric clustered processor organization of claim 12 further comprising an instruction cache for providing said instructions having a maximum width of W-bits to said steering logic via a decode logic and a register rename logic.

16. The asymmetric clustered processor organization of claim 12 further comprising a level-0 translation look-aside buffer.

17. The asymmetric clustered processor organization of claim 16 wherein said level-0 translation look-aside buffer is in communication with said concatenation/sign extension operator.

18. The asymmetric clustered processor organization of claim 12 further comprising a truncation/sign compression operator in communication with said N-bit register file.

19. A method for processing an instruction, said method comprising the steps of:
   steering the instruction to a selected one of a W-bit Wide integer cluster or a N-bit Narrow integer cluster, where a data path width N is less than a data path width W, said steering action based on a predictive process; and
   if a W-bit instruction is steered to said Wide integer cluster, processing said W-bit instruction via a W-bit Wide arithmetic logic unit;
   if an N-bit instruction is steered to said Wide integer cluster, processing said N-bit instruction via said W-bit Wide arithmetic logic unit;
   if an N-bit instruction is steered to said Narrow integer cluster, processing said N-bit instruction via an N-bit Narrow arithmetic logic unit;
   if said W-bit instruction is steered to said Narrow integer cluster, replaying said W-bit instruction to said Wide integer cluster.

20. The method of claim 19 wherein said step of steering the instruction includes the steps of utilizing a predictor and updating said predictor based on instruction execution result.

21. The method of claim 19 wherein said Wide integer cluster includes a 44-bit Wide Addr register file and said Narrow integer cluster includes a 44-bit Narrow Addr register file, said Wide Addr register file being a replicated version of said Narrow Addr register file.

22. The method of claim 21 wherein an upper part of an instruction operand is stored in said Narrow Addr register file and a lower part of said instruction operand is stored in a Narrow Register file, with a Narrow Register Descriptor comprising a two-bit field denoting a value type for said instruction operand included in said Narrow register file.

23. The method of claim 21 further comprising the step of:
   updating and freeing said Wide Addr register file and said Narrow Addr register file; and
   detecting when a W-bit register file in a W-bit Wide integer cluster contains a common upper part with one of said Wide Addr register file and said Narrow Addr register file.

24. The method of claim 22 further comprising the step of initiating a write to said Wide Addr register file if said Narrow Addr register file is updated.

25. The method of claim 19 wherein the proportion of instructions steered to said Narrow integer cluster varies as a function of the data path width N in said Narrow integer cluster.

26. The method of claim 19 wherein said predictive process comprises an initial value set to point to said Wide integer cluster so as to minimize mis-prediction.

27. The method of claim 19 further comprising the step of setting a mis-prediction flag if said W-bit instruction is steered to said Narrow integer cluster.

* * * * *

UNITED STATES PATENT AND TRADEMARK OFFICE
CERTIFICATE OF CORRECTION

| | | |
|---|---|---|
| PATENT NO. | : 7,380,105 B2 | Page 1 of 1 |
| APPLICATION NO. | : 11/424829 | |
| DATED | : May 27, 2008 | |
| INVENTOR(S) | : Alexander V. Veidenbaum et al. | |

It is certified that error appears in the above-identified patent and that said Letters Patent is hereby corrected as shown below:

Please insert the following after the title of the invention and before the heading "BACKGROUND OF THE INVENTION":

--GOVERNMENT RIGHTS

This invention was made with government support under grant number CCR0311738 awarded by the National Science Foundation. The government has certain rights in the invention.--

Signed and Sealed this

Fifth Day of January, 2010

David J. Kappos
*Director of the United States Patent and Trademark Office*